United States Patent [19]

Hoffmann et al.

[11] Patent Number: 4,782,913

[45] Date of Patent: Nov. 8, 1988

[54] CONSTRUCTIONAL ELEMENT WITH ACOUSTIC PROPERTIES

[75] Inventors: Manfred Hoffmann, Nienhof; Norbert Seemann, Nienhagen, both of Fed. Rep. of Germany

[73] Assignee: Dr. Alois Stankiewicz GmbH, Adelheidsdorf, Fed. Rep. of Germany

[21] Appl. No.: 46,462

[22] Filed: May 4, 1987

[30] Foreign Application Priority Data

May 6, 1986 [DE] Fed. Rep. of Germany ....... 3615360

[51] Int. Cl.⁴ ............................................. E04B 1/82
[52] U.S. Cl. .................................... 181/286; 181/288; 181/291
[58] Field of Search ............... 181/204, 213, 214, 286, 181/288, 291, 293

[56] References Cited

U.S. PATENT DOCUMENTS

| | | | |
|---|---|---|---|
| 3,773,141 | 11/1973 | Thien et al. | 181/293 |
| 4,301,890 | 11/1981 | Zalas | 181/286 |
| 4,450,195 | 5/1984 | Hagbjer | 181/288 X |

FOREIGN PATENT DOCUMENTS

| | | |
|---|---|---|
| 2758041 | 12/1977 | Fed. Rep. of Germany . |
| 2921050 | 5/1979 | Fed. Rep. of Germany . |
| 3030238 | 8/1980 | Fed. Rep. of Germany . |
| 8211797 | 4/1982 | Fed. Rep. of Germany . |
| 3233654 | 9/1982 | Fed. Rep. of Germany . |
| 3313001 | 4/1983 | Fed. Rep. of Germany . |

OTHER PUBLICATIONS

"Larmbekampfung," (Noise Abatement) by Shirmer and Kollektis, Verlag Tribune Berlin, 1974, pp. 374-375.

*Primary Examiner*—B. R. Fuller
*Attorney, Agent, or Firm*—Scully, Scott, Murphy & Presser

[57] ABSTRACT

A three-dimensional, formable constructional element (1) with acoustic properties is provided, having a shell (2) with a low natural bending stiffness to which webs (3) are fixed so as to form a cellular grid. It is important that over the whole extent of the shell (2) the dimensions both of the webs (3) and of the cells (4) that they form together with the shell (2), and also the shape of the shell (2) itself, can be freely chosen. The cells (4) are closed on the outside on the side distant from the shell (2) by a foil system (5) that includes flattened, in particular lens-shaped, air pockets (6). In this way optimum acoustic tuning can be achieved in respect of the incident sound waves on the air-filled cell chambers utilizing frictional damping, so as to achieve maximum absorption of airborne sound.

9 Claims, 2 Drawing Sheets

CONSTRUCTIONAL ELEMENT WITH ACOUSTIC PROPERTIES

TECHNICAL FIELD OF THE INVENTION

The invention relates to a constructional element with acoustic properties, according to the preamble of claim 1.

BACKGROUND OF THE INVENTION

A constructional element of this kind is known from German Offenlegungsschrift No. 32 33 654.

More stringent conditions for the protection of the environment require traffic noise to be minimized as far as possible, and in particular sound emission from motor vehicles to be reduced by measures in the region of the main source of noise, namely the engine. Various proposals have recently been made to this end.

The desired reduction in external noise in the engine compartments of motor vehicles is undertaken in particular with the aid of bulkheads beneath the engine that close off what would otherwise be free surfaces for the escape of sound by an acoustically effective element. While a procedure of this kind certainly generally decreases the external sound level, there is a risk for the user that as a result of the shape of such a bulkhead beneath the engine, which neither is nor can be optimized, the noise level inside the passenger compartment will be increased. It is generally known that this negative effect can be prevented by providing the bulkhead beneath the engine, as well as the freely accessible walls of the engine compartment, with a material or system that absorbs airborne sound by means of which the sound reflections that otherwise occur with smooth boundary surfaces are avoided and the overall sound level is lowered.

Previous embodiments of such acoustically effective engine bulkheads have as a rule employed supporting shells having high mechanical strength, which require relatively expensive materials and costly manufacturing processes. Such shells are preferably provided with foam-based absorbers for airborne sound, e.g. in the form of directly applied compressed foam having laminated surfaces, or with compressed and molded foam foils spaced away from the carrier shell. Known possibilities for tuning absorbers of foam- or fibre-base materials are available to the man skilled in the art from the literature. The factors that can be influenced can be found in any appropriate textbook.

The prior art mentioned above (cf. German Offenlegungsschrift No. 32 33 654) provides sound-absorbing constructional elements with flat surfaces and an internal cellular structure, consisting essentially of foils of strictly geometrical form, as a result of which the surfaces of these foils can be excited to loss-making vibrations (or oscillations). These loss-making vibrations' which are used as a means of absorbing airborne sound, are bending vibrations of the so-called plates or boundary surfaces, as is explained in German Pat. No. 27 58 041 (column 3, lines 33-45).

The basic idea that sound absorption is effected by natural plate vibrations of the surfaces—mainly the bottom surfaces—of the strictly geometrical chambers formed by foils, is explained in detail (German Offenlegungsschrift No. 32 33 654, page 4, lines 11-17). The frequency band width of such absorbers, however, is obviously very narrow unless additional steps are taken. It is also disclosed (loc. cit., page 7, lines 34/35 and page 8, lines 1-6) how such an absorber can be tuned to given spectra, e.g. of motor vehicles, which generally need a wide-band treatment. The chambers should be divided by pits or depressions, preferably in a cruciform arrangement, into a plurality of sub-chambers, which then together lead to broadening of the absorption band without its absolute value being lowered.

Constructional elements of the kind described above suffer from various disadvantages. For example, the use in the usual way of expensive high-strength plastics together with equally costly production processes, due for example to the incorporation of glass fibre in the materials, is obviously already a disadvantage. This disadvantage is particularly serious in mass production. It also has to be taken into account, in the case of foam-based absorbers, that if the surface is damaged the underlying foam can quickly become saturated with moisture, for example water, but also gasoline or oil. The efficiency of absorption is thereby greatly and noticeably reduced, and in addition saturation with inflammable substances is a source of considerable danger that has to be avoided. While the flat constructional elements described are acoustically effective and can be tuned to predetermined frequency bands, the external geometry of the bodywork that is laid down as essential by the motor vehicle manufacturer prevents such flat elements being used as fully functional vehicle parts with a required acoustic efficiency. The use of the cellular structures described requires flat elements with strictly geometrical grids. There is the additional condition that the boundary surfaces of the chambers formed by the cellular structure must still be capable of vibration, i.e. of being excited to bending vibrations. In fact it is mentioned in German Offenlegungsschrift No. 30 30 238 (page 8, last paragraph) that a base closure plate can be made as a very stiff, rigid plate. This is explained using as an example of flat coating surfaces the walls of tunnels, etc. that have previously been prepared using suitable supporting walls. In this case however, at least some of the faces of the chamber must be capable of being excited to natural plate vibration.

OBJECT OF THE INVENTION

It is therefore an object of the present invention to provide a constructional element with acoustic properties that can have a shape that can be chosen at will but whose absorption behaviour can nevertheless be tuned to predetermined frequency bands and of which the absolute values for the absorption of airborne sound can be raised to far higher values than hitherto.

Besides the required absorption of airborne sound a bulkhead of this kind beneath an engine should also have an appreciable absorption effect on airborne sound and meet the mechanical requirements in respect of high stiffness.

SUMMARY OF THE INVENTION

The object is achieved by the characterising features of claim 1.

Further developments of the invention comprise the features of the sub-claims.

Thus cellular or honeycomb structures can be used that have almost any desired geometry, even inside the constructional element, which makes it possible to obtain extraordinarily suitable embodiments while observing the geometrical parameters, such as the geometry of a motor vehicle, that apply to any given application.

The cellular structure, together with the webs that are attached to the shell, gives a high degree of stiffness, thus making it unnecessary to use self-supporting plastic materials of high mechanical strength as the coating on the outside, e.g. the street side. This also enables unstiffened foil systems to be used without tensioning as the coating on the engine side when the constructional element is used as an engine bulkhead.

The shaped and advantageously three-dimensional constructional element with acoustic properties that has been proposed thus removes the prejudice that when such constructions are used absorption is only possible with the use of the natural plate vibrations. The geometry of the webs of the cellular structure can be chosen at will, which gives the designer of such structural elements a great deal of freedom. Because the honeycomb structure has cells closed on all sides the absorber can never be made completely useless by moisture: in the worst case at most a few cells will be damaged.

For sound sources such as an engine, foil systems that exhibit air inclusions or pockets and have extraordinarily low intrinsic stiffness can be used as (upper) covers. The air pockets have a flattened shape, e.g. a lens shape, so that there is obviously only a single natural frequency (cf. German Offenlegungsschrift No. 29 21 050, page 10, paragraph 2). This is in a frequency range that is too high to be of interest for the object, such as a motor vehicle, that is to be protected. The whole of the energy of the incident airborne sound is thus used to excite purely piston-like vibrations of the various irregularly shaped cells or honeycomb chambers. The only effect is thus that of the wave resistance in air, so that the match between the incident airborne sound and the air enclosed in the honeycomb cells is ideal. This leads, as tests have already shown, to very high values of absorption of airborne sound, which are clearly distinguished from the known state of the art. The differently sized honeycomb cells, which are particularly advantageous from a constructional point of view the air pockets in the foil systems, and the utilization of various frictional effects, all lead to a very favorable band width in respect of absorption of airborne sound.

Since natural plate vibrations are not necessary to effect the absorption of airborne sound in the constructional element according to the invention, materials with high internal damping, such as plastics, can be used for the shell and the webs. This makes it possible to effect sound absorption in the material despite the high bending strength that is desired, and thereby to prevent secondary airborne sound radiation from constructional elements, in particular those used as engine bulkheads.

The constructional elements according to the invention represent a considerable advance over conventional systems. The additional positive properties of increased absorption of airborne sound and reduced secondary airborne sound radiation are an additional contribution to an optimal overall effect.

BRIEF DESCRIPTION OF THE DRAWINGS

The invention will now be described in more detail with reference to an exemplary embodiment shown in the drawings, in which.

DETAILED DESCRIPTION OF A PREFERRED EMBODIMENT OF THE INVENTION

Figure 1:
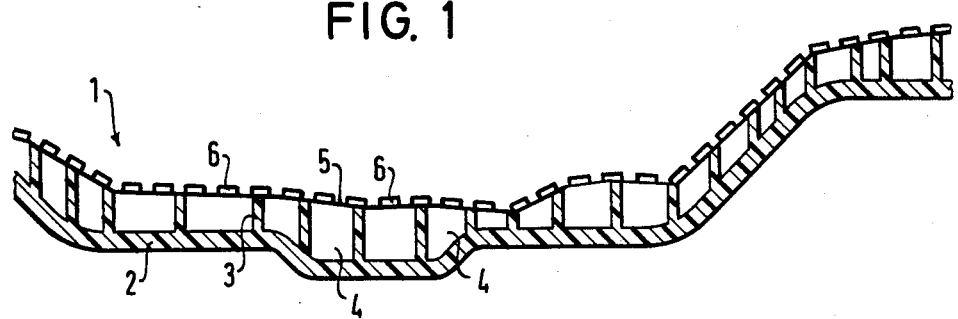
FIG. 1 shows a section through a constructional element formed according to the invention.

FIG. 1 is a sectional view of a constructional element 1 comprising a molded shell 2 carrying webs 3 arranged substantially parallel to one another in the plane of the section. Chambers or cells 4 are formed between the webs 3: seen from above these can have various geometrical shapes, for example 3-, 4-, 6-cornered and so on. The webs 3 are of different heights. At the ends of the webs 3 distant from the shell 2 a foil system 5 is attached having air pockets 6, indicated diagrammatically. The shape of the foil system 5 can, as shown, differ markedly from that of the shell 2.

Figure 2:
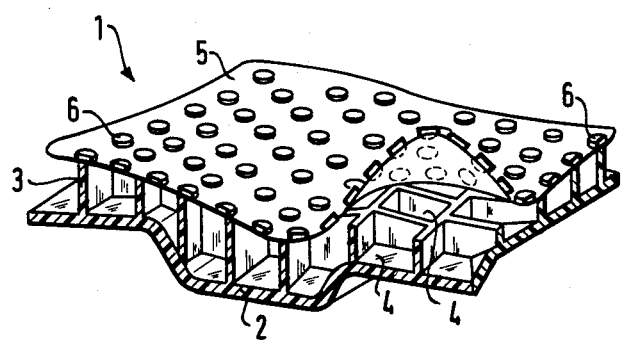
FIG. 2 shows in perspective and diagrammatically a constructional element according to the invention in which part of the foil system is raised.

In practice the shape of the shell 2 and the shape of the foil system follow the requirements of the particular design. In one application of the constructional element 1 as an engine bulkhead for the engine compartment of a motor vehicle the exterior of the shell faces the street and the inner side of the foil system 5 faces the engine. These set the design considerations according to which the shell 2 and the foil system 5 are shaped in three dimensions. This is shown in perspective in FIG. 2, which also shows that the cells 4 can have different dimensions. It has been found in practice to be desirable for the acoustic effectiveness of an adjacent cell if the webs 3 have a minimum height of 5 mm. Equally it is desirable for the foil system 5 that closes off the cells 4 to have a weight per unit area of between 80 and 150 $gm^{-2}$.

Advantageously the shell 2 and the webs 3 consist of a suitable material with high internal damping, in particular a plastic. For simplicity of manufacture it is desirable for the webs 3 and shell 2 to be formed integrally. They can then advantageously be made by an injection molding or RIM (recirculation injection molding) process (cf. G. Woods, "Flexible polyurethane foams", Chemistry & Technology, 1982, pages 206–225).

The foil system 5 is to a large extent shown diagrammatically. As indicated, the air pockets 6 may be provided by forming the parts of the foil system 5 that surround the air pockets 6 as lump- or knot-like projections within which the air pockets are contained. Such projections may be distributed over the whole area of the foil system 5 either uniformly or non-uniformly. They can be of the same kind over the whole surface of the foil system 5, or they can be different. When both their shape and their distribution over the surface of the foil system are uniform, pieces cut from a mass-produced length can advantageously be used.

With suitable values of the low natural bending strength of the shell 2 and the webs 3, and suitable dimensions of the chambers 4 and the webs 3, a complete constructional element 1 is obtained that is in itself already self-supporting and also produces the desired acoustic effect.

Figure 3:
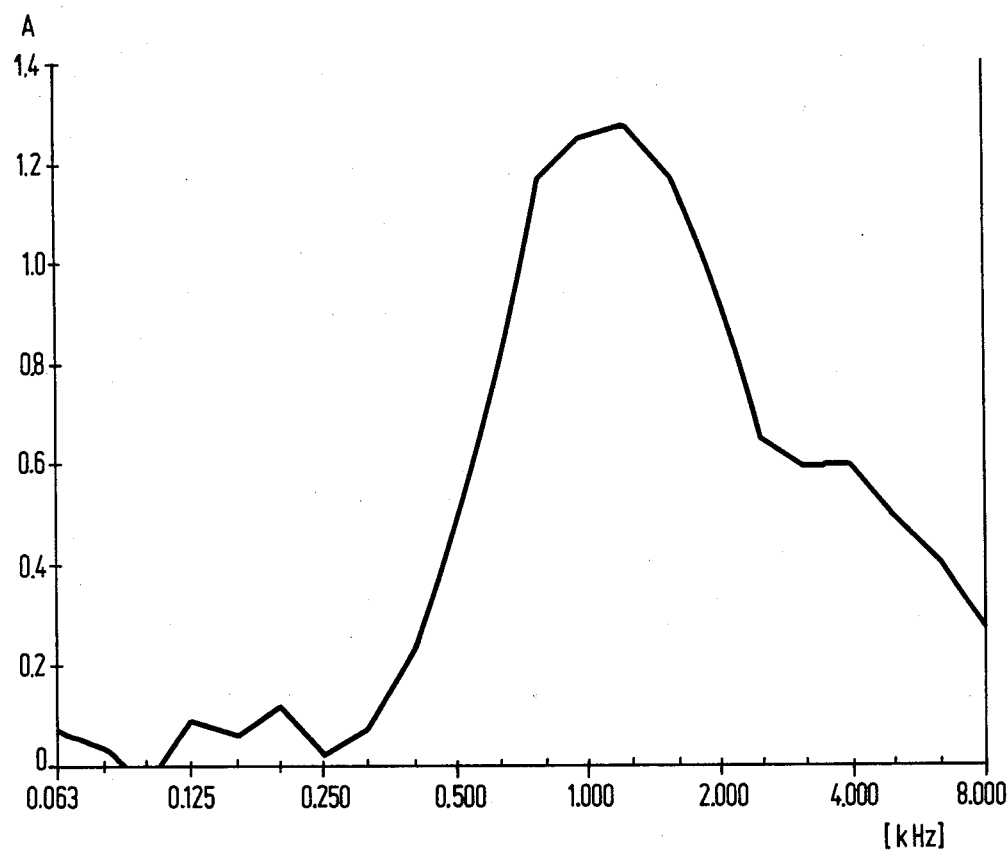
FIG. 3 shows the degree of absorption of airborne sound by a constructional element according to the invention, plotted against frequency, measured according to DIN 52 212 in a reverberation chamber.

FIG. 3 shows the degree of absorption A of airborne sound, determined according to DIN 52 212 in a reverberation chamber, by a constructional element according to the invention, plotted against frequency. This shows that in the frequency range that is of decisive importance, particularly for screening engine compartments of motor vehicles, very high absorption is attained.

What is claimed is:

1. A constructional element having acoustic properties, consisting of a shell having a low intrinsic bending stiffness webs integrally constructed with and fixed to the shell and forming a cellular grid defining individual cells, and a foil system having low bending stiffness closing off the cells opposite said shell, characterized in that the foil system is provided with flattened air pockets, and dimensions of the webs forming the individual cells and dimensions of the shell are selected such that the individual cells are irregularly distributed and differently sized so as to achieve acoustic tuning, utilizing frictional damping and only considering sound wave resistance in air, so that absorption of airborne sound is achieved.

2. A constructional element according to claim 1, characterised in that the shell is shaped in three dimensions.

3. A constructional element according to claim 1, characterised in that the whole constructional element is shaped in three dimensions.

4. A constructional element according to claim 1, characterised in that the form and dimensions of the cells are so selected in relation to the shell that the constructional element as a whole has high bending stiffness 5. A constructional element according to claim 1, characterised in that the webs consist of a material, in particular a plastic, having high internal damping capacity.

6. A constructional element according to claim 1, characterised in that the shell consists of a material, in particular a plastic, having high internal damping capacity.

7. A constructional element according to claim 1, characterised in that the height of the webs is at least 5 mm.

8. A constructional element according to claim 1, characterised in that the foil system has a mass per unit area between 80 and 150 $gm^{-2}$.

9. A constructional element with acoustic properties according to claim 1, whereby said element forms a lower engine bulkhead for motor vehicles, whereby the contours of said element are maintained with maximum acoustic effect.

* * * * *